United States Patent
Murashima et al.

(10) Patent No.: US 12,454,627 B2
(45) Date of Patent: Oct. 28, 2025

(54) BIODEGRADABLE LAMINATED ARTICLE AND METHOD FOR PRODUCING THE SAME

(71) Applicant: KANEKA CORPORATION, Osaka (JP)

(72) Inventors: Kensuke Murashima, Settsu (JP); Itsuki Kusakabe, Settsu (JP); Masayuki Fujita, Settsu (JP); Yasunori Okada, Settsu (JP)

(73) Assignee: KANEKA CORPORATION, Osaka (JP)

( * ) Notice: Subject to any disclaimer, the term of this patent is extended or adjusted under 35 U.S.C. 154(b) by 190 days.

(21) Appl. No.: 18/569,700

(22) PCT Filed: Jun. 10, 2022

(86) PCT No.: PCT/JP2022/023513
§ 371 (c)(1),
(2) Date: Dec. 13, 2023

(87) PCT Pub. No.: WO2022/264944
PCT Pub. Date: Dec. 22, 2022

(65) Prior Publication Data
US 2024/0270998 A1    Aug. 15, 2024

(30) Foreign Application Priority Data
Jun. 16, 2021 (JP) .................................. 2021-100014

(51) Int. Cl.
*C09D 167/04*    (2006.01)
*B32B 7/02*    (2019.01)
(Continued)

(52) U.S. Cl.
CPC .............. *C09D 167/04* (2013.01); *B32B 7/02* (2013.01); *B32B 27/10* (2013.01); *B32B 27/36* (2013.01);
(Continued)

(58) Field of Classification Search
CPC ...... B32B 27/00–27/42; C09D 167/00–167/08
See application file for complete search history.

(56) References Cited

U.S. PATENT DOCUMENTS

2007/0184220 A1 * 8/2007 Cleveland ............... B32B 27/08
428/34.2
2018/0345637 A1    12/2018 Hackfort et al.

FOREIGN PATENT DOCUMENTS

JP             10-6444 A        1/1998
WO    WO-2013182757 A1 * 12/2013 ............ B32B 27/20
WO    WO 2016/079244 A1    5/2016

OTHER PUBLICATIONS

International Search Report issued Aug. 23, 2022 in PCT/JP2022/023513, filed on Jun. 10, 2022, 2 pages.

* cited by examiner

*Primary Examiner* — Prashant J Khatri
(74) *Attorney, Agent, or Firm* — Oblon, McClelland, Maier &Neustadt, L.L.P.

(57) ABSTRACT

A biodegradable laminated article includes: a substrate layer; a first thermoplastic resin (A1) layer located on one side of the substrate layer and containing a polyhydroxyalkanoate resin; and a second thermoplastic resin (A2) layer located on the other side of the substrate layer and containing a polyhydroxyalkanoate resin. The weight per unit area of the first thermoplastic resin (A1) layer is from 10 to 200 $g/m^2$, and the weight per unit area of the second thermoplastic resin (A2) layer is from 0.1 to 5 $g/m^2$.

8 Claims, 1 Drawing Sheet

(51) Int. Cl.
    *B32B 27/10*     (2006.01)
    *B32B 27/36*     (2006.01)
    *C08G 63/06*     (2006.01)

(52) U.S. Cl.
    CPC .......... *C08G 63/06* (2013.01); *B32B 2250/03* (2013.01); *B32B 2307/7163* (2013.01); *B32B 2307/718* (2013.01); *B32B 2307/748* (2013.01); *B32B 2553/00* (2013.01); *C08G 2230/00* (2013.01)

BIODEGRADABLE LAMINATED ARTICLE AND METHOD FOR PRODUCING THE SAME

CROSS-REFERENCE TO RELATED APPLICATIONS

The present application is a 35 U.S.C. § 371 national stage patent application of International patent application PCT/JP2022/023513, filed on Jun. 10, 2022, which is based on and claims the benefits of priority to Japanese Patent Application No. 2021-100014, filed on Jun. 16, 2021. The entire contents of all of the above applications are incorporated herein by reference.

TECHNICAL FIELD

The present invention relates to a biodegradable laminated article including a substrate layer and thermoplastic resin layers located on both sides of the substrate layer and to a method for producing the biodegradable laminated article.

BACKGROUND ART

In recent years, environmental problems due to waste plastics have become an issue of great concern. In particular, waste plastics have caused serious marine pollution, and there is a demand for widespread use of biodegradable plastics which are degradable in the natural environment. Various kinds of such biodegradable plastics are known. A copolymer (hereinafter also referred to as "PHBH") of 3-hydroxy butyrate (hereinafter also referred to as "3HB") and 3-hydroxyhexanoate (hereinafter also referred to as "3HH") is a thermoplastic polyester produced and accumulated as an energy storage substance in cells of many kinds of microorganisms. This thermoplastic polyester is biodegradable in seawater as well as in soil and thus is attracting attention as a material that can be a solution to the abovementioned problems. A laminated article produced by forming a layer of PHBH on an environmentally-degradable substrate such as paper through an aqueous coating process or a lamination process is very promising in terms of environmental protection because both the substrate and PHBH are environmentally-degradable materials.

In general, a layer containing PHBH can be used for bonding to a substrate such as paper. Additionally, such a PHBH-containing layer is excellent in water resistance or oil resistance; thus, when used as an inner surface layer of a molded article such as a paper cup, the PHBH-containing layer functions as a barrier layer to prevent a material filling the interior of the molded article from seeping into the substrate of the molded article.

However, PHBH is difficult to spread on a substrate such as paper since the viscosity of PHBH does not readily decrease during melting by heating. When attempting to obtain a high-quality molded article by bonding a PHBH-containing layer to a substrate such as paper, PHBH needs to be thoroughly heated up to a temperature well above its melting point. Such heating results in an increase in the time taken for resin solidification and leads to, for example, poor bonding in a molded article such as a paper container or a reduction in production rate during a continuous production process. Thus, PHBH has much room for improvement in terms of workability.

Patent Literature 1 discloses a biodegradable laminated article including: a paper substrate: a layer containing a polyhydroxyalkanoate resin and located on one side of the paper substrate; and a layer containing a polyester formed from polycondensation of a dicarboxylic acid and a glycol, the layer being located on the other side of the paper substrate.

CITATION LIST

Patent Literature

PTL 1: Japanese Laid-Open Patent Application Publication No. H10-6444

SUMMARY OF INVENTION

Technical Problem

However, the biodegradable laminated article of Patent Literature 1 is disadvantageous in that when water is applied to the laminated article for the purpose of, for example, correcting warpage which occurs due to a cause such as winding of the laminated article into a roll, the substrate cannot absorb the water sufficiently to remove the warpage satisfactorily. Additionally, the laminated article has room for improvement also in terms of processing efficiency: for example, when the laminated article is molded into a paper container or the like, the resin layer located on the outside of the cup becomes sticky upon heating and experiences blocking to the mold of the molding machine.

In view of the above circumstances, the present invention aims to provide: a biodegradable laminated article including a substrate layer and polyhydroxyalkanoate resin-containing thermoplastic resin layers located on both sides of the substrate layer, the laminated article having water absorbency high enough to remove warpage which occurs due to a cause such as winding of the laminated article into a roll, being less likely to experience blocking to a mold of a molding machine when molded into a paper container or the like, and being able to exhibit high bond performance even when subjected to molding at a low temperature; and a method for producing the biodegradable laminated article.

Solution to Problem

As a result of intensive studies with the goal of solving the problems as described above, the present inventors have found that a biodegradable laminated article including a substrate layer and polyhydroxy alkanoate resin-containing thermoplastic resin layers located on both sides of the substrate layer can be a solution to the problems when the weight per unit area of one of the thermoplastic resin layers is much smaller than the weight per unit area of the other thermoplastic resin layer. Based on this finding, the inventors have completed the present invention.

Specifically, the present invention relates to a biodegradable laminated article including:
  a substrate layer;
  a first thermoplastic resin (A1) layer located on one side of the substrate layer and containing a polyhydroxyalkanoate resin; and
  a second thermoplastic resin (A2) layer located on the other side of the substrate layer and containing a polyhydroxyalkanoate resin, wherein
  a weight per unit area of the first thermoplastic resin (A1) layer is from 10 to 200 g/m$^2$, and a weight per unit area of the second thermoplastic resin (A2) layer is from 0.1 to 5 g/m$^2$.

Advantageous Effects of Invention

The present invention can provide: a biodegradable laminated article including a substrate layer and polyhydroxyalkanoate resin-containing thermoplastic resin layers located on both sides of the substrate layer, the laminated article having water absorbency high enough to remove warpage which occurs due to a cause such as winding of the laminated article into a roll, being less likely to experience blocking to a mold of a molding machine when molded into a paper container or the like, and being able to exhibit high bond performance even when subjected to molding at a low temperature; and a method for producing the biodegradable laminated article. The use of the biodegradable laminated article produced by the production method of the present invention allows for improvement in the efficiency of production or the quality of a molded article.

DESCRIPTION OF EMBODIMENTS

Figure 1:
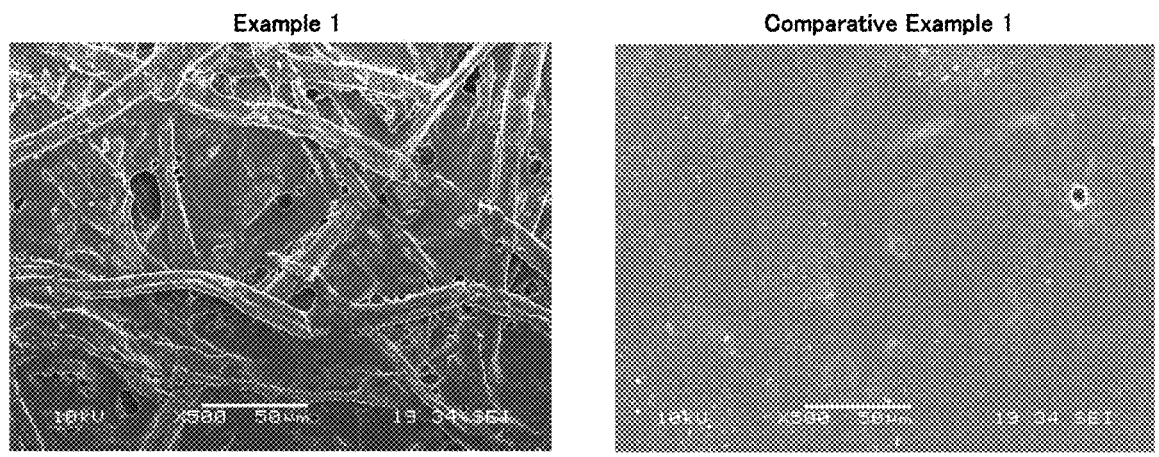
FIG. 1 shows an image of the surface of a second thermoplastic resin (A2) layer of a biodegradable laminated article produced in Example 1, an image of the surface of a second thermoplastic resin (A2) layer of a biodegradable laminated article produced in Comparative Example 1, and an image of the surface of a paper substrate of a biodegradable laminated article produced in Comparative Example 4, and the images are those taken with a scanning electron microscope at a magnification of 500 times.
Figure 1:
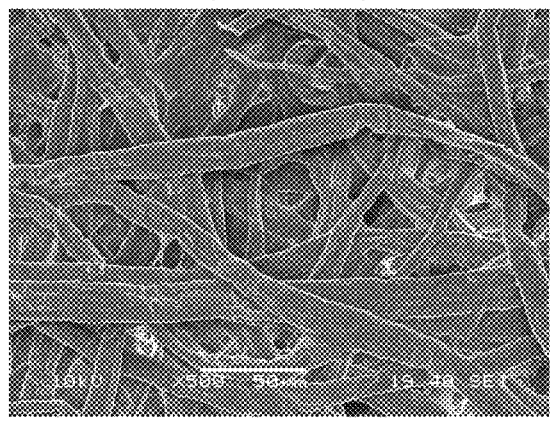
Figure 2:
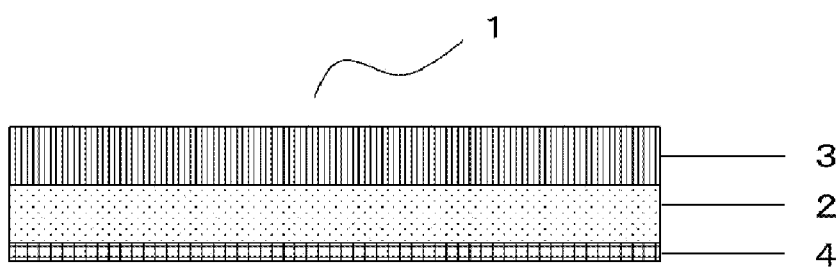
FIG. 2 is a schematic cross-sectional view of a biodegradable laminated article according to one aspect of the present invention.

Hereinafter, embodiments of the present invention will be described. The present invention is not limited to the embodiments described below.
[Laminated Article]
A biodegradable laminated article according to one embodiment of the present disclosure includes: a substrate layer such as paper; a first thermoplastic resin (A1) layer containing a polyhydroxyalkanoate resin and located on one side of the substrate layer; and a second thermoplastic resin (A2) layer containing a polyhydroxyalkanoate resin and located on the other side of the substrate layer. The first thermoplastic resin (A1) layer, the substrate layer, and the second thermoplastic resin (A2) layer are arranged in this order.

The first thermoplastic resin (A1) layer and the second thermoplastic resin (A2) layer may be located directly on the substrate layer such as paper, or there may be another layer between the substrate layer and the first thermoplastic resin (A1) layer or the second thermoplastic resin (A2).

In one embodiment of the present disclosure, other layers such as adhesive layers may be located on the first thermoplastic resin (A1) layer and the second thermoplastic resin (A2) layer.

Each of the first thermoplastic resin (A1) layer and the second thermoplastic resin (A2) layer may be an outermost layer of the biodegradable laminated article.

The first thermoplastic resin (A1) layer and the second thermoplastic resin (A2) layer may contain the same or different components. The proportions of the components in the first thermoplastic resin (A1) layer and the proportions of the components in the second thermoplastic resin (A2) layer may be the same or different.
(Substrate Layer)
The substrate layer according to the present disclosure is not limited to a particular type of layer and may be any layer with biodegradability. Examples of the substrate layer include a layer of paper (whose main component is cellulose), a layer of cellophane, a layer of cellulose ester, a layer of polyvinyl alcohol, a layer of polyamino acid, a layer of polyglycolic acid, a layer of pullulan, and any of these layers on which an inorganic substance such as aluminum or silica is vapor-deposited. A layer of paper is preferred because it has high heat resistance and is inexpensive.

The paper is not limited to a particular type, and examples of the paper include cup paper, kraft paper, high-quality paper, coated paper, tissue paper, glassine paper, and paperboard. The type of the paper can be selected as appropriate depending on the intended use of the laminated article. Additives such as a water-resisting agent, a water repellent, and an inorganic substance may be added to the paper as necessary. The paper may be one subjected to a surface treatment such as oxygen barrier coating treatment or water vapor barrier coating treatment.

The substrate layer may be subjected to a surface treatment such as corona treatment, ozone treatment, plasma treatment, flame treatment, anchor coat treatment, oxygen barrier coating treatment, or water vapor barrier coating treatment. One of these surface treatments may be performed alone, or two or more surface treatments may be used in combination.
(First Thermoplastic Resin (A1) and Second Thermoplastic Resin (A2))

Each of the first thermoplastic resin (A1) and the second thermoplastic resin (A2) includes one polyhydroxyalkanoate resin or two or more polyhydroxyalkanoate resins. Polyhydroxyalkanoate resins are biodegradable resins. The first thermoplastic resin (A1) and the second thermoplastic resin (A2) may include the same or different polyhydroxyalkanoate resins.

Each of the resin components of the first and second thermoplastic resins (A1) and (A2) preferably includes 50 wt % or more of a polyhydroxyalkanoate resin, and the weight percentage of the polyhydroxyalkanoate resin is more preferably 70 wt % or more, even more preferably 80 wt % or more, still even more preferably 90 wt % or more, and particularly preferably 95 wt % or more. Each of the resin components may consist only of the polyhydroxyalkanoate resin. Any of biodegradable resins as mentioned later can be used as a resin component other than the polyhydroxyvalkanoate resin.

The polyhydroxyvalkanoate resin (which may be abbreviated as "PHA" hereinafter) refers to any polymer containing a hydroxyalkanoic acid as a monomer unit. Examples of the hydroxyalkanoic acid as a constituent of the PHA include, but are not limited to, 3-hydroxy butanoic acid, 4-hydroxy butanoic acid, 3-hydroxypropionic acid, 3-hydroxypentanoic acid, 3-hydroxyhexanoic acid, 3-hydroxyheptanoic acid, and 3-hydroxyoctanoic acid. The PHA may be a homopolymer or a copolymer containing two or more types of monomer units.

In terms of seawater degradability, the PHA is preferably a homopolymer or copolymer containing 3-hydroxy butyrate units and more preferably a copolymer containing 3-hydroxy butyrate units and other hydroxyalkanoate units.

Specific examples of the polymer containing 3-hydroxy butyrate units include poly(3-hydroxy butyrate) abbreviate as "PHB", poly(3-hydroxy butyrate-co-3-hydroxyhexanoate) abbreviated as "PHBH", poly(3-hydroxy butyrate-co-3-hydroxyvalerate) abbreviated as "P3HB3HV", poly(3-hydroxy butyrate-co-4-hydroxy butyrate) abbreviated as "P3HB4HB", poly(3-hydroxy butyrate-co-3-hydroxyoctanoate) abbreviated as "P3HB3HO", poly(3-hydroxy butyrate-co-3-hydroxyoctadecanoate) abbreviated as "P3HB3HOD", poly(3-hydroxy butyrate-co-3-hydroxy decanoate) abbreviated as "P3HB3HD", and poly(3-hydroxy butyrate-co-3-hydroxyvalerate-co-3-hydroxyhexanoate) abbreviated as "P3HB3HV3HH". Among these, PHB, PHBH, P3HB3HV, and P3HB4HB are preferred since they are easy to industrially produce.

PHBH is particularly preferred for the following reasons: the ratio between the repeating units can be varied to change the melting point and crystallinity and thus adjust the physical properties such as the Young's modulus and heat resistance to levels intermediate between those of polypropylene and polyethylene; and this plastic is easy to industrially produce and useful in terms of physical properties.

Each of the resin components of the first and second thermoplastic resins (A1) and (A2) preferably includes 50 wt % or more of PHBH, and the weight percentage of PHBH is more preferably 70 wt % or more, even more preferably 80 wt % or more, still even more preferably 90 wt % or more, and particularly preferably 95 wt % or more. Each of the resin components may consist only of PHBH.

A polyhydroxyalkanoate resin as mentioned above which is other than PHBH can be used as a resin component in combination with PHBH. A biodegradable resin other than polyhydroxyalkanoate resins can also be used in combination with PHBH, and examples of such a biodegradable resin include: aliphatic polyester resins such as polycaprolactone, polybutylene succinate adipate, polybutylene succinate, and polylactic acid; and aliphatic-aromatic polyester resins such as polybutylene adipate terephthalate and poly butylene azelate terephthalate.

A specific method for producing PHBH is described, for example, in WO 2010/013483. Examples of commercially-available PHBH include "Kaneka Biodegradable Polymer Green Planet™", of Kaneka Corporation.

The average content ratio between the constituent monomers (3HB/3HH) in PHBH is preferably from 97 to 75/3 to 25 (mol %/mol %) and more preferably from 94 to 82/6 to 18 (mol %/mol %). When the average 3HH content in PHBH is 3 mol % or more, the laminated article can exhibit good bond performance upon heat sealing even if the heat sealing is performed at a low temperature. The crystallization rate of PHBH having an average 3HH content of 25 mol % or less is not excessively low, and the production of such PHBH is relatively easy.

The average content ratio between the constituent monomers in PHBH can be determined by a method known to those skilled in the art, and the method is, for example, a method described in paragraph of WO 2013/147139 or NMR analysis. The average content ratio refers to the molar ratio between 3HB and 3HH contained in PHBH. In the case where the PHBH is a mixture containing at least two types of PHBH or containing at least one type of PHBH and PHB, the average content ratio refers to the molar ratio between the monomers contained in the total mixture.

As stated above, PHBH having an average 3HH content of 3 to 25 mol % particularly preferably includes at least two types of PHBH differing in the contents of the constituent monomers. It is also preferable for PHBH having an average 3HH content of 3 to 25 mol % to include at least one type of PHBH and PHB.

In the case where PHBH having an average 3HH content of 3 to 25 mol % includes at least two types of PHBH, the at least two types of PHBH preferably include high-crystallinity PHBH having a 3HH monomer content of less than 6 mol % and low-crystallinity PHBH having a higher 3HH monomer content. This composition offers an advantage over PHBH consisting of one type of PHBH. Specifically, in melt processing, crystals of the high-crystallinity PHBH having a 3HH monomer content of less than 6 mol % are not completely melted but remain and act as crystal nuclei to accelerate crystallization. This makes it easier to form the first thermoplastic resin (A1) layer and the second thermoplastic resin (A2) layer by extrusion lamination, thermal lamination, or a coating method.

In the case where PHBH having an average 3HH content of 3 to 25 mol % includes at least one type of PHBH and PHB, the PHB can act as crystal nuclei to achieve the same effect as the high-crystallinity PHBH. It is also possible to use PHBH having an average 3HH content of less than 3 mol % in combination with PHB.

The percentage of 3HH to the total content of 3HB and 3HH in the high-crystallinity PHBH is preferably 5 mol % or less, more preferably 4 mol % or less, and even more preferably 3 mol % or less. The percentage of 3HH to the total content of 3HB and 3HH in the low-crystallinity PHBH is preferably from 10 to 40 mol % and more preferably from 15 to 30 mol %.

The amount of the high-crystallinity PHBH or PHB is not limited to a particular range, but is preferably from 1 to 60 wt %, more preferably from 2 to 50 wt %, and even more preferably from 4 to 15 wt % in the resin component contained in the thermoplastic resin (A1) layer or thermoplastic resin (A2) layer.

The weight-average molecular weight (hereinafter also referred to as "Mw") of the PHA contained in the first thermoplastic resin (A1) or second thermoplastic resin (A2) is preferably from $15 \times 10^4$ to $65 \times 10^4$, more preferably from $25 \times 10^4$ to $55 \times 10^4$, and even more preferably from $35 \times 10^4$ to $45 \times 10^4$ in terms of ensuring both good mechanical properties and high workability. When the weight-average molecular weight of the PHA is $15 \times 10^4$ or more, good mechanical properties can be achieved. When the weight-average molecular weight of the PHA is $65 \times 10^4$ or less, a melt viscosity suitable for molding can easily be achieved. The Mw of the PHA contained in the first thermoplastic resin (A1) and the Mw of the PHA contained in the second thermoplastic resin (A2) may be the same or different.

The weight-average molecular weight of the PHA can be determined as a polystyrene-equivalent molecular weight measured by gel permeation chromatography (GPC; "Shodex GPC-101" manufactured by Showa Denko K.K.) using a polystyrene gel ("Shodex K-804" manufactured by Showa Denko K.K) as the column and chloroform as the mobile phase.

In one embodiment of the present disclosure, a mixture of two or more types of PHA having different weight-average molecular weights can be used in the first thermoplastic resin (A1) layer and/or second thermoplastic resin (A2) layer. In particular, in the case where two types of PHA are mixed, both high heat sealability at low temperature and good mechanical properties can be achieved, for example, by using a mixture of PHA having a weight-average molecular weight of $15 \times 10^4$ to $35 \times 10^4$ and PHA having a weight-average molecular weight of $45 \times 10^4$ to $65 \times 10^4$. Thus, the use of such a mixture can provide an effect comparable to that achieved when PHBH having a certain weight-average molecular weight is used alone.

The first thermoplastic resin (A1) and/or second thermoplastic resin (A2) may contain additives commonly added to resin materials, to the extent that the additives do not impair the effect of the invention. Examples of the additives include: inorganic fillers; colorants such as pigments and dyes; odor absorbers such as activated carbon and zeolite; flavors such as vanillin and dextrin; plasticizers; oxidation inhibitors; antioxidants; weathering resistance improvers; ultraviolet absorbers; nucleating agents; lubricants; mold releases; water repellents; antimicrobials; slidability improvers; and other secondary additives. One or more of these additives may be added to the first thermoplastic resin (A1) and/or second thermoplastic resin (A2).

The additives are optional components, and the first thermoplastic resin (A1) and/or second thermoplastic resin (A2) need not contain these components. Among the optional components, a lubricant and/or an inorganic filler is preferably used to further improve the separability of the first thermoplastic resin (A1) or second thermoplastic resin (A2) from the surface of pressure bonding means such as a cooling roll which is used to form a layer of the first thermoplastic resin (A1) or second thermoplastic resin (A2) by lamination.

Examples of the lubricant include: aliphatic amide compounds, as exemplified by saturated or unsaturated fatty acid amides such as lauramide, myristamide, palmitamide, stearamide, behenamide, oleamide, and erucamide and alkylene fatty acid amides such as methylenebis(stearamide) and methylenebis(stearamide); and pentaerythritol.

Examples of the inorganic filler include particles of talc, calcium carbonate, mica, silica, clay, kaolin, titanium oxide, alumina, or zeolite which have an average particle size of 0.5 µm or more.

The amount of the lubricant in the first thermoplastic resin (A1) or second thermoplastic resin (A2) is preferably from 0.1 to 2 parts by weight and more preferably from 0.2 to 1 parts by weight per 100 parts by weight of the first thermoplastic resin (A1) or second thermoplastic resin (A2). When the amount of the lubricant is 0.1 parts by weight or more, the separability improving effect can be achieved by the addition of the lubricant. When the amount of the lubricant is 2 parts by weight or less, the lubricant is less likely to bleed and attach to the surface of pressure bonding means such as a cooling roll during pressure bonding, and continuous processing can be performed for a long period of time.

The amount of the inorganic filler in the first thermoplastic resin (A1) or second thermoplastic resin (A2) is preferably from 0.5 to 5 parts by weight and more preferably from 1 to 3 parts by weight per 100 parts by weight of the first thermoplastic resin (A1) or second thermoplastic resin (A2). When the amount of the inorganic filler is 0.5 parts by weight or more, the separability improving effect can be achieved by the addition of the inorganic filler. When the amount of the inorganic filler is 5 parts by weight or less, the occurrence of cracking in the first thermoplastic resin (A1) layer or second thermoplastic resin (A2) layer can be reduced.

Examples of the method for forming the first thermoplastic resin (A1) layer and/or second thermoplastic resin (A2) layer include extrusion lamination, thermal lamination, and a method in which an aqueous coating liquid prepared by dissolving or dispersing the first thermoplastic resin (A1) or second thermoplastic resin (A2) in a liquid such as water is applied to the surface of the substrate layer such as paper and then heated and dried into a solid layer (this method may be referred to as "coating method" hereinafter). In particular, the coating method is preferred for use in the case where each thermoplastic resin layer is formed directly on the substrate layer such as paper without interposing another layer between the thermoplastic resin layer and the substrate layer such as paper, because with the use of the coating method, the bond strength between the thermoplastic resin and the substrate layer such as paper can be easily enhanced thanks to infiltration of part of the coating liquid into the substrate layer such as paper.

The heating temperature in the extrusion lamination or thermal lamination may be freely chosen from among hitherto known conditions, but is preferably equal to or higher than the melting point of the resin material (PHA-containing resin material forming the thermoplastic resin) and less than 30° C. above the melting point. When the extrusion lamination or thermal lamination is performed at such a temperature, the thermoplastic resin layer can be formed without decomposition of the PHA.

In the coating method, it is preferable, after applying the aqueous coating liquid to the surface of the substrate and forming a film of the aqueous coating liquid on the surface of the substrate, to use at least one technique selected from the group consisting of blowing of hot air, infrared irradiation, ultrasonic irradiation, and contact with a heating roll to heat the film of the aqueous coating liquid to a temperature equal to or higher than the melting point of the resin material and less than 30° C. above the melting point and thus turn the film into a solid layer. Solid layer formation at such a temperature allows the PHA to melt on the surface of the substrate without decomposing, resulting in the thermoplastic resin layer having high uniformity.

The weight per unit area of the first thermoplastic resin (A1) layer is preferably at least 10 g/m$^2$, more preferably 20 g/m$^2$ or more, and particularly preferably 30 g/m$^2$ or more. The weight per unit area is preferably at most 200 g/m$^2$, more preferably 100 g/m$^2$ or less, and particularly preferably 50 g/m$^2$ or less. When the weight per unit area of the first thermoplastic resin (A1) layer is in the range of 10 to 200 g/m$^2$, the first thermoplastic resin (A1) layer can function as a barrier layer, and high bond performance can be achieved in heat sealing for forming a paper container or the like.

The weight per unit area of the second thermoplastic resin (A2) layer is preferably at least 0.1 g/m$^2$, more preferably 0.5 g/m$^2$ or more, and particularly preferably 1 g/m$^2$ or more. The weight per unit area is preferably at most 5 g/m$^2$, more preferably 3 g/m$^2$ or less, and particularly preferably 2 g/m$^2$ or less. When the weight per unit area of the second thermoplastic resin (A2) layer is in the range of 0.1 to 5 g/m$^2$, at least a part of the surface of the substrate is bare without being covered by the resin layer, and this offers the following advantages: the laminated article has water absorbency high enough to remove warpage which occurs due to winding of the laminated article into a roll, is less likely to experience blocking to a mold of a molding machine when molded into a paper container or the like, and is able to exhibit high bond performance upon heat sealing even if the heat sealing is performed at a low temperature.

In one embodiment of the present disclosure, when cup paper with a weight per unit area of 150 to 350 g/m$^2$ is used as the substrate layer such as paper, the weight per unit area of the first thermoplastic resin (A1) layer is preferably from 20 to 100 g/m$^2$ and more preferably from 30 to 50 g/m$^2$. When the first thermoplastic resin (A1) layer has a thickness such that its weight per unit area is in the above range, the laminated article according to one embodiment of the present disclosure (this laminated article may be hereinafter referred to as "present laminated article") can have good workability properties such as punchability and heat sealability suitable for secondary processing.

[Molded Article]

A molded article according to one embodiment of the present disclosure (this molded article may be hereinafter referred to as "present molded article") includes the present laminated article. The present molded article is made with the laminated article including the PHA-containing resin layers whose surfaces are in good condition, and is thus advantageous for various purposes.

The present molded article is not limited to a particular product and may be any product including the present laminated article. Examples of the present molded article include paper, a film, a sheet, a tube, a plate, a rod, a receptacle (such as a bottle), a bag, and a part. In terms of addressing marine pollution, the present molded article is preferably a bag or a bottle.

In one embodiment of the present disclosure, the present molded article may be the present laminated article itself or may be produced by secondary processing of the present laminated article.

The present molded article including the present laminated article subjected to secondary processing is suitable for use as any of various kinds of packaging materials or receptacles such as shopping bags, various other kinds of bags, packaging materials for foods or confectionery products, cups, trays, and cartons. That is, the present molded article is suitable for use in various fields such as food industry, cosmetic industry, electronic industry, medical industry, and pharmaceutical industry. Since the present laminated article contains a resin composition having high bond performance to the substrate and having high heat resistance, the present molded article is more preferred for use as a receptacle for a hot substance. Examples of such a receptacle include: liquid receptacles such as, in particular, cups for foods or beverages such as instant noodles, instant soups, and coffee; and trays used for prepared foods, boxed lunches, or microwavable foods.

The various kinds of secondary processing can be performed using a technique identical to that used for secondary processing of conventional resin-laminated paper or coated paper. That is, the various kinds of secondary processing can be performed by means such as a bag-making machine or form-fill-seal machine. Alternatively, the laminated article may be processed using a device such as a paper cup molding machine, a punching machine, or a case former. In any of these processing machines, any known technique can be used for bonding of the present laminated article. Examples of the technique that can be used include heat sealing, impulse sealing, ultrasonic sealing, high-frequency sealing, hot air sealing, and flame sealing.

The heat sealing temperature at which the present laminated article is heat-sealed depends on the bonding technique used. For example, in the case where the present laminated article is heat-sealed using a heat sealing tester equipped with a sealing bar, the heat sealing temperature is typically set such that the surface temperature of at least one of the first thermoplastic resin (A1) layer and the second thermoplastic resin (A2) layer is 180° C. or lower, preferably 170° C. or lower, and more preferably 160° C. or lower. When the surface temperature is in this range, melting and leakage of the resin in the vicinity of the sealed portion can be avoided to ensure a suitable thickness of the resin layer and a suitable seal strength. Since the present laminated article can exhibit good bond performance even when heat-sealed at a low temperature, the surface temperature may be 150° C. or lower or 140° C. or lower.

In the case of using a heat sealing tester equipped with a sealing bar, the surface temperature is typically 100° C. or higher, preferably 110° C. or higher, and more preferably 120° C. or higher. When the surface temperature is in this range, suitable bonding can be ensured at the sealed portion.

The heat sealing pressure at which the present laminated article is heat-sealed depends on the bonding technique used. For example, in the case where the present laminated article is heat-sealed using a heat sealing tester equipped with a sealing bar, the heat sealing pressure is typically 0.1 MPa or more and preferably 0.5 MPa or more. When the heat sealing pressure is in this range, suitable bonding can be ensured at the sealed portion. In the case of using a heat sealing tester equipped with a sealing bar, the heat sealing pressure is typically 1.0 MPa or less and preferably 0.75 MPa or less. When the heat sealing pressure is in this range, thinning of the sealed edge can be avoided to ensure a satisfactory seal strength.

The present molded article may, for the purpose of physical property improvement, be combined with another molded article (such as a fiber, a yarn, a rope, a woven fabric, a knit, a non-woven fabric, paper, a film, a sheet, a tube, a plate, a rod, a receptacle, a bag, a part, or a foam) made of a different material than the present molded article. The material of the other molded article is also preferably biodegradable.

In the following items, preferred aspects of the present disclosure are listed. The present invention is not limited to the following items.

[Item 1]

A biodegradable laminated article including:
a substrate layer;
a first thermoplastic resin (A1) layer located on one side of the substrate layer and containing a polyhydroxyalkanoate resin; and
a second thermoplastic resin (A2) layer located on the other side of the substrate layer and containing a polyhydroxyalkanoate resin, wherein
a weight per unit area of the first thermoplastic resin (A1) layer is from 10 to 200 g/m$^2$, and
a weight per unit area of the second thermoplastic resin (A2) layer is from 0.1 to 5 g/m$^2$.

[Item 2]

The biodegradable laminated article according to item 1, wherein a weight-average molecular weight of each of the polyhydroxyalkanoate resins is from $15 \times 10^4$ to $65 \times 10^4$.

[Item 3]

The biodegradable laminated article according to item 1 or 2, wherein each of the polyhydroxyalkanoate resins includes a polymer having 3-hydroxy butyrate units.

[Item 4]

The biodegradable laminated article according to item 3, wherein each of the polyhydroxyalkanoate resins includes a copolymer of 3-hydroxybutyrate units and 3-hydroxyhexanoate units.

[Item 5]

A method for producing the biodegradable laminated article according to any one of items 1 to 4, the method including:
forming at least one of the first thermoplastic resin (A1) layer and the second thermoplastic resin (A2) layer by extrusion lamination or thermal lamination at a temperature that is equal to or higher than a melting point of a resin material and that is less than 30° C. above the melting point.

[Item 6]

A method for producing the biodegradable laminated article according to any one of items 1 to 4, the method including:

forming a film of an aqueous coating liquid containing a polyhydroxyalkanoate resin on a substrate by applying the aqueous coating liquid to the substrate; and forming at least one of the first thermoplastic resin (A1) layer and the second thermoplastic resin (A2) layer by heating the film of the aqueous coating liquid to a temperature using at least one technique selected from the group consisting of blowing of hot air, infrared irradiation, ultrasonic irradiation, and contact with a heating roll, wherein the temperature is equal to or higher than a melting point of a resin material and is less than 30° C. above the melting point.

[Item 7]

A molded article including the biodegradable laminated article according to any one of items 1 to 4.

[Item 8]

A method for producing the molded article according to item 7, the method including:

heating at least one of the first thermoplastic resin (A1) layer and the second thermoplastic resin (A2) layer to a surface temperature that is 100° C. or higher and lower than 170° C.

EXAMPLES

Hereinafter, the present invention will be specifically described using examples. The technical scope of the present invention is not limited by the examples given below.

Production Example (Method for Producing Aqueous Dispersion Containing PHBH as Main Component)

A resin dispersion containing PHBH (3HH content=11.0 mol %, melting point=120° C.) at a solids concentration of 50 wt % was obtained according to a method described in WO 2004/041936. Where necessary, the resin dispersion was diluted with pure water to adjust the solids concentration. The weight-average molecular weight of the PHBH was $62 \times 10^4$.

(Adjustment of Weight-Average Molecular Weight of PHBH in Aqueous Dispersion)

The resin dispersion was held at 60° C. and subjected to hydrolysis to obtain a dispersion containing PHBH having a weight-average molecular weight of $23 \times 10^4$.

(Aqueous Mixed Dispersion Prepared as Mixture of Resin Dispersions Differing in Resin Weight-Average Molecular Weight)

An amount of the aqueous dispersion containing PHBH having a weight-average molecular weight of $62 \times 10^4$ and the same amount of the aqueous dispersion containing PHBH having a weight-average molecular weight of $23 \times 10^4$ were weighed, and the weighed dispersions were mixed to obtain an aqueous mixed dispersion.

(Method for Producing Aqueous Coating Liquid)

To 100 parts by weight of each of the above dispersions were added 0.3 parts by weight of an anti-settling agent (Optigel MW, manufactured by BYK Additives & Instruments) for preventing settling of the PHBH and 30 parts by weight of a 2% aqueous solution of methylcellulose (METOLOSE SM-400, manufactured by Shin-Etsu Chemical Co., Ltd.), and the mixture was stirred to obtain an aqueous coating liquid.

[Evaluation Methods]

Evaluations in Examples and Comparative Examples were conducted by the methods described below.

(Evaluation of 180° Peel Strength)

A heat sealing test was performed one or more days after resin layer formation processes. In the test, a heat sealer (TP-701-B, manufactured by Tester Sangyo Co., Ltd.) was used, and the surface of the first thermoplastic resin (A1) layer and the surface of the second thermoplastic resin (A2) layer were placed on each other and subjected to thermal pressure bonding at 0.4 MPa for 5 seconds. The maximum temperature of the resin surfaces during the bonding was 106° C., 127° C., or 141° C.

In accordance with JIS Z 0238, the resulting heat-sealed article was cut into a 15-mm-wide piece, and the 15-mm-wide piece was subjected to a peel strength test. The chuck-to-chuck distance was 100 mm, and the tensile speed was 300 mm/min. The peel tester used was Shimadzu Autograph EZ-LX (manufactured by Shimadzu Corporation).

<Ratings>

Good: 3.0 N/15 mm or more

Average: From 2.5 N/15 mm to below 3.0 N/15 mm

Poor: Below 2.0 N/15 mm

The rating "Good" or "Average" means that the bond performance was high enough to obtain a high-quality molded article.

(Evaluation of Blocking during Heating)

An upper heat sealing bar of a heat sealer (TP-701-B, manufactured by Tester Sangyo Co., Ltd.) was heated to 180° C. The biodegradable laminated article was placed with the second thermoplastic resin (A2) layer in contact with the upper heat sealing bar, and then subjected to thermal pressure bonding at 0.4 MPa for 5 seconds. After the pressure bonding, whether the biodegradable laminated article stuck to or dropped from the heat sealing bar was checked. This cycle was repeated three times.

<Ratings>

Good: The biodegradable laminated article dropped from the heat sealing bar without sticking to the heat sealing bar (did not experience blocking) in all the three cycles.

Average: The biodegradable laminated article stuck to the heat sealing bar in at least one of the three cycles but finally dropped from the heat sealing bar (did not experience blocking) in all the three cycles.

Poor: The biodegradable laminated article stuck to the heat sealing bar and did not drop from the heat sealing bar (experienced blocking) in at least one of the three cycles.

The rating "Good" or "Average" means that when heated, the laminated article did not become so sticky as to experience problematic blocking to the mold.

(Evaluation of Warpage after Decurling)

The biodegradable laminated article was cut into a rectangular piece with a width of 65 mm and a length of 240 mm. The rectangular piece of the biodegradable laminated article was then subjected to moisture conditioning/decurling in which the second thermoplastic resin (A2) layer was exposed to steam from boiling water for 1 minute. Subsequently, the rectangular piece of the biodegradable laminated article was allowed to stand at normal temperature and pressure (27° C., humidity=65%) for 1 hour. After that, the rectangular piece of the biodegradable laminated article was placed on a flat surface, and the height of each of the four corners of the rectangular piece from the flat surface was measured.

<Ratings>
Good: The average of the heights of the four corners was 2 mm or less.
Average: The average of the heights of the four corners was more than 2 mm and 5 mm or less.
Poor: The average of the heights of the four corners was more than 5 mm.
The rating "Good" means that warpage was removed as a result of sufficient water absorption.
(Weight per Unit Area of PHBH)

Each of the biodegradable laminated articles obtained in Examples and Comparative Examples was cut into a 10 cm×10 cm-sized piece, the weight of which was measured. The weight of the substrate paper or the sum of the weights of the substrate paper and the backside thermoplastic resin layer was subtracted from the measured weight of the 10 cm×10 cm-sized piece, and the difference was multiplied by 100. The resulting value was defined as the weight per unit area.
(Observation of Surface of Thermoplastic Resin (A2) Layer)

The surface of the formed resin layer was observed with a scanning electron microscope (SEM JSM-6060 LA, manufactured by JEOL Ltd.) at a magnification of 500 times.

Example 1

A4-sized substrate paper with a weight per unit area of 210 g/m² was coated with an aqueous coating liquid by means of a bar coater No. 40. The aqueous coating liquid contained PHBH having a weight-average molecular weight of 62×10⁴ at a solids concentration of 48 wt %. The coated paper was dried at normal temperature for 5 minutes and then subjected to a resin layer formation process in which the coated paper was heated by a hot-air drying oven to increase the resin temperature to 137° C. A first thermoplastic resin (A1) layer was thus formed.

Next, the side of the resulting layered product opposite from the first thermoplastic resin (A1) layer was coated with an aqueous coating liquid by means of a bar coater No. 7, and the coated layered product was dried at normal temperature for 5 minutes. The aqueous coating liquid contained PHBH having a weight-average molecular weight of 62×10⁴ at a solids concentration of 13 wt %. The coated layered product was then subjected to a resin layer formation process in which the coated layered product was heated by a hot-air drying oven to increase the resin temperature to 137° C. A second thermoplastic resin (A2) layer was thus formed.

The weight per unit area of the first thermoplastic resin (A1) layer was 48 g/m², and the weight per unit area of the second thermoplastic resin (A2) layer was 1.2 g/m².

The biodegradable laminated article obtained as above was subjected to heat sealing at a resin temperature of 141° C. and a pressure of 0.4 MPa. At 48 hours after the heat sealing, the biodegradable laminated article was subjected to the 180° peel strength test as described below: The biodegradable laminated article was subjected also to the blocking test and the evaluation of warpage after decurling.

Example 2

Procedures were performed which were the same as those in Example 1, except that the resin temperature reached in the heat sealing was 127° C.

Example 3

Procedures were performed which were the same as those in Example 3, except that the resin temperature reached in the heat sealing was 106° C.

Example 4

Procedures were performed which were the same as those in Example 1, except that an aqueous coating liquid containing PHBH having a weight-average molecular weight of 23×10⁴ at a solids concentration of 13 wt % was used to form the second thermoplastic resin (A2) layer.

Example 5

Procedures were performed which were the same as those in Example 4, except that the resin temperature reached in the heat sealing was 127° C.

Example 6

Procedures were performed which were the same as those in Example 2, except that an aqueous coating liquid containing PHBH having a weight-average molecular weight of 23×10⁴ at a solids concentration of 48 wt % was used to form the first thermoplastic resin (A1) layer.

Example 7

Procedures were performed which were the same as those in Example 5, except that an aqueous coating liquid containing PHBH having a weight-average molecular weight of 23×10⁴ at a solids concentration of 48 wt % was used to form the first thermoplastic resin (A1) layer.

Example 8

Procedures were performed which were the same as those in Example 5, except that an aqueous mixed dispersion containing PHBH having a weight-average molecular weight of 62×10⁴ and PHBH having a weight-average molecular weight of 23×10⁴ was used to form the first thermoplastic resin (A1) layer.

Example 9

Procedures were performed which were the same as those in Example 1, except that a bar coater No. 14 was used instead of the bar coater No. 40 to form the first thermoplastic resin (A1) layer. The weight per unit area of the first thermoplastic resin (A1) layer was 18 g/m², and the weight per unit area of the second thermoplastic resin (A2) layer was 1.2 g/m².

Example 10

Procedures were performed which were the same as those in Example 9, except that an aqueous coating liquid containing PHBH having a weight-average molecular weight of 23×10⁴ at a solids concentration of 13 wt % was used to form the second thermoplastic resin (A2) layer.

Example 11

Procedures were performed which were the same as those in Example 5, except that a bar coater No. 14 was used instead of the bar coater No. 40 to form the first thermoplastic resin (A1) layer.

Example 12

Procedures were performed which were the same as those in Example 6, except that a bar coater No. 14 was used instead of the bar coater No. 40 to form the first thermoplastic resin (A1) layer.

Example 13

Procedures were performed which were the same as those in Example 11, except that an aqueous coating liquid containing PHBH having a weight-average molecular weight of $23 \times 10^4$ at a solids concentration of 48 wt % was used to form the first thermoplastic resin (A1) layer.

Comparative Example 1

Procedures were performed which were the same as those in Example 1, except that a bar coater No. 25 was used instead of the bar coater No. 7 to form the second thermoplastic resin (A2) layer.

Comparative Example 2

Procedures were performed which were the same as those in Example 6, except that a bar coater No. 75 was used instead of the bar coater No. 7 to form the second thermoplastic resin (A2) layer.

Comparative Example 3

Procedures were performed which were the same as those in Example 4, except that a bar coater No. 25 was used instead of the bar coater No. 7 to form the second thermoplastic resin (A2) layer.

Comparative Example 4

Procedures were performed which were the same as those in Example 2, except that any second thermoplastic resin (A2) layer was not formed on the side of the layered product opposite from the first thermoplastic resin (A1) layer.

Comparative Example 5

Procedures were performed which were the same as those in Example 9, except that any second thermoplastic resin (A2) layer was not formed on the side of the layered product opposite from the first thermoplastic resin (A1) layer.

Comparative Example 6

Procedures were performed which were the same as those in Example 12, except that any second thermoplastic resin (A2) layer was not formed on the side of the layered product opposite from the first thermoplastic resin (A1) layer.

| | Thermoplastic resin (A1) layer | | | | Thermoplastic resin (A2) layer | |
|---|---|---|---|---|---|---|
| | Weight-average molecular weight | Weight per unit area (g/m$^2$) | 3HH content (mol %) | Melting point (° C.) | Weight-average molecular weight | Weight per unit area (g/m$^2$) |
| Ex. 1 | $62 \times 10^4$ | 48 | 11.0 | 120 | $62 \times 10^4$ | 1.2 |
| Ex. 2 | $62 \times 10^4$ | 48 | 11.0 | 120 | $62 \times 10^4$ | 1.2 |
| Ex. 3 | $62 \times 10^4$ | 48 | 11.0 | 120 | $23 \times 10^4$ | 1.2 |
| Ex. 4 | $62 \times 10^4$ | 48 | 11.0 | 120 | $23 \times 10^4$ | 1.2 |
| Ex. 5 | $62 \times 10^4$ | 48 | 11.0 | 120 | $23 \times 10^4$ | 1.2 |
| Ex. 6 | $23 \times 10^4$ | 48 | 11.0 | 120 | $62 \times 10^4$ | 1.2 |
| Ex. 7 | $23 \times 10^4$ | 48 | 11.0 | 120 | $23 \times 10^4$ | 1.2 |
| Ex. 8 | $43 \times 10^4$ (Average of $23 \times 10^4$ + $62 \times 10^4$) | 48 | 11.0 | 120 | $23 \times 10^4$ | 1.2 |
| Ex. 9 | $62 \times 10^4$ | 18 | 11.0 | 120 | $62 \times 10^4$ | 1.2 |
| Ex. 10 | $62 \times 10^4$ | 18 | 11.0 | 120 | $23 \times 10^4$ | 1.2 |
| Ex. 11 | $62 \times 10^4$ | 18 | 11.0 | 120 | $23 \times 10^4$ | 1.2 |
| Ex. 12 | $23 \times 10^4$ | 18 | 11.0 | 120 | $62 \times 10^4$ | 1.2 |
| Ex. 13 | $23 \times 10^4$ | 18 | 11.0 | 120 | $23 \times 10^4$ | 1.2 |
| Comp. 1 | $62 \times 10^4$ | 48 | 11.0 | 120 | $62 \times 10^4$ | 6.0 |
| Comp. 2 | $23 \times 10^4$ | 48 | 11.0 | 120 | $23 \times 10^4$ | 18.0 |
| Comp. 3 | $62 \times 10^4$ | 48 | 11.0 | 120 | $23 \times 10^4$ | 6.0 |
| Comp. 4 | $62 \times 10^4$ | 48 | 11.0 | 120 | — | 0 |
| Comp. 5 | $62 \times 10^4$ | 18 | 11.0 | 120 | — | 0 |
| Comp. 6 | $23 \times 10^4$ | 18 | 11.0 | 120 | — | 0 |

| | Thermoplastic resin (A2) layer | | Resin temperature during bonding (° C.) | Evaluation results | | | |
|---|---|---|---|---|---|---|---|
| | 3HH content (mol %) | Melting point (° C.) | | 180° peel strength (N/15 mm) | Rating | Blocking | Warpage after decurling |
| Ex. 1 | 11.0 | 120 | 141 | 3.1 | Good | Good | Good |
| Ex. 2 | 11.0 | 120 | 127 | 2.6 | Good | Average | Good |
| Ex. 3 | 11.0 | 120 | 106 | 2.1 | Average | Good | Good |

-continued

|  | | | | | | | |
|---|---|---|---|---|---|---|---|
| Ex. 4 | 11.0 | 120 | 141 | 3.1 | Good | Good | Good |
| Ex. 5 | 11.0 | 120 | 127 | 2.6 | Average | Good | Good |
| Ex. 6 | 11.0 | 120 | 127 | 3.1 | Good | Good | Good |
| Ex. 7 | 11.0 | 120 | 127 | 3.4 | Good | Good | Good |
| Ex. 8 | 11.0 | 120 | 127 | 3.2 | Good | Good | Good |
| Ex. 9 | 11.0 | 120 | 141 | 2.6 | Average | Good | Good |
| Ex. 10 | 11.0 | 120 | 141 | 3.3 | Good | Good | Good |
| Ex. 11 | 11.0 | 120 | 127 | 2.8 | Average | Good | Good |
| Ex. 12 | 11.0 | 120 | 127 | 3.0 | Good | Good | Good |
| Ex. 13 | 11.0 | 120 | 127 | 2.6 | Average | Good | Good |
| Comp. 1 | 11.0 | 120 | 141 | 3.7 | Good | Poor | Average |
| Comp. 2 | 11.0 | 120 | 127 | 3.4 | Good | Poor | Poor |
| Comp. 3 | 11.0 | 120 | 127 | 2.6 | Average | Poor | Average |
| Comp. 4 | 11.0 | 120 | 127 | 1.7 | Poor | Good | Good |
| Comp. 5 | 11.0 | 120 | 141 | 0.8 | Poor | Good | Good |
| Comp. 6 | 11.0 | 120 | 127 | 1.6 | Poor | Good | Good |

<Results>

Table 1 reveals that each of the laminated articles of Examples exhibits high bond performance when subjected to heat sealing at a low temperature, is free from the risk of persistently sticking to the heat sealing bar, and has water absorbency high enough so that warpage of the laminated article is removable by exposure to steam.

It is also seen that any of the laminated articles of Comparative Examples cannot combine high bond performance, avoidance of sticking to the heat sealing bar, and sufficient water absorbency.

Referring to FIG. 1, comparison of the surface of the second thermoplastic resin (A2) layer of the biodegradable laminated article of Example 1 with the surface of the substrate of Comparative Example 4 reveals that in Example 1, the surface of the substrate is not entirely covered by the resin, but the resin attaches to some regions of the substrate. This is presumably why the biodegradable laminated article of Example 1 has water absorbency high enough so that warpage of the laminated article is removable by decurling.

In contrast, as seen from the image of the surface of the second thermoplastic resin (A2) layer of the biodegradable laminated article of Comparative Example 1, the entire surface of the substrate is covered by the resin in Comparative Example 1. This is presumably why the water absorbency of the biodegradable laminated article of Comparative Example 1 is insufficient so that warpage of the biodegradable laminated article is difficult to remove by decurling.

As can be seen from the foregoing description, the present invention can provide: a biodegradable laminated article that has water absorbency high enough to remove warpage which occurs due to a cause such as winding of the laminated article into a roll, that is less likely to experience blocking to a mold of a molding machine when molded into a paper container or the like, and that is able to exhibit high bond performance even when subjected to molding at a low temperature; and a method for producing the biodegradable laminated article.

REFERENCE SIGNS LIST 1 biodegradable laminated article
2 substrate layer such as paper
3 first thermoplastic resin (A1) layer
4 second thermoplastic resin (A2) layer

The invention claimed is:

1. A biodegradable laminated article, comprising:
a substrate layer;
a first thermoplastic resin (A1) layer located on one side of the substrate layer and comprising a polyhydroxyalkanoate resin; and
a second thermoplastic resin (A2) layer located on the other side of the substrate layer and comprising a polyhydroxyalkanoate resin, wherein
a weight per unit area of the first thermoplastic resin (A1) layer is from 10 to 200 g/m$^2$, and
a weight per unit area of the second thermoplastic resin (A2) layer is from 0.1 to 5 g/m$^2$.

2. The biodegradable laminated article according to claim 1, wherein a weight-average molecular weight of each of the polyhydroxyalkanoate resins is from $15 \times 10^4$ to $65 \times 10^4$.

3. The biodegradable laminated article according to claim 1, wherein each of the polyhydroxyalkanoate resins comprises a polymer having 3-hydroxybutyrate units.

4. The biodegradable laminated article according to claim 3, wherein each of the polyhydroxyalkanoate resins comprises a copolymer of 3-hydroxybutyrate units and 3-hydroxyhexanoate units.

5. A method for producing the biodegradable laminated article according to claim 1, the method comprising:
forming at least one of the first thermoplastic resin (A1) layer and the second thermoplastic resin (A2) layer by extrusion lamination or thermal lamination at a temperature that is equal to or higher than a melting point of a resin material and that is less than 30° C. above the melting point.

6. A method for producing the biodegradable laminated article according to claim 1, the method comprising:
forming a film of an aqueous coating liquid containing a polyhydroxyalkanoate resin on a substrate by applying the aqueous coating liquid to the substrate; and
forming at least one of the first thermoplastic resin (A1) layer and the second thermoplastic resin (A2) layer by heating the film of the aqueous coating liquid to a temperature using at least one technique selected from the group consisting of blowing of hot air, infrared irradiation, ultrasonic irradiation, and contact with a heating roll, wherein the temperature is equal to or higher than a melting point of a resin material and is less than 30° C. above the melting point.

7. A molded article comprising the biodegradable laminated article according to claim 1.

8. A method for producing the molded article according to claim 7, the method comprising:
heating at least one of the first thermoplastic resin (A1) layer and the second thermoplastic resin (A2) layer to a surface temperature of from 100° C. to lower than 170° C.

* * * * *